US010089057B2

(12) United States Patent
Dow et al.

(10) Patent No.: US 10,089,057 B2
(45) Date of Patent: Oct. 2, 2018

(54) DISPLAY REDISTRIBUTION BETWEEN A PRIMARY DISPLAY AND A SECONDARY DISPLAY

(71) Applicant: International Business Machines Corporation, Armonk, NY (US)

(72) Inventors: Eli M. Dow, Wappingers Falls, NY (US); Thomas D. Fitzsimmons, Poughkeepsie, NY (US); Tynan J. Garrett, Poughkeepsie, NY (US); Emily M. Metruck, Poughkeepsie, NY (US); Charles J. Stocker, IV, Plainsboro, NJ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 112 days.

(21) Appl. No.: 15/177,498

(22) Filed: Jun. 9, 2016

(65) Prior Publication Data

US 2017/0177290 A1 Jun. 22, 2017

Related U.S. Application Data

(63) Continuation of application No. 14/972,206, filed on Dec. 17, 2015.

(51) Int. Cl.
*G09G 5/00* (2006.01)
*G06F 3/14* (2006.01)
(Continued)

(52) U.S. Cl.
CPC ............ *G06F 3/1454* (2013.01); *G09G 5/12* (2013.01); *G02B 2027/0178* (2013.01);
(Continued)

(58) Field of Classification Search
CPC .......... G02B 27/017; G02B 2027/0178; G06F 1/163; G06F 3/1423; G06F 3/1446;
(Continued)

(56) References Cited

U.S. PATENT DOCUMENTS 5,877,745 A * 3/1999 Beeteson ............... G09G 5/006
345/156
6,137,473 A * 10/2000 Cortopassi ............ G06F 1/1613
345/156

(Continued)

OTHER PUBLICATIONS

Eli M. Dow, et al., Pending U.S. Appl. No. 14/972,2016 entitled "Display Redistribution Between a Primary Display and a Secondary Display," filed Dec. 17, 2015.
(Continued)

*Primary Examiner* — Michael J Eurice
(74) *Attorney, Agent, or Firm* — Cantor Colburn LLP

(57) ABSTRACT

An aspect includes a computer implemented method for display redistribution between a personal display and an external display. The method includes initiating, by a primary device, a wireless connection between a primary device and a secondary device. The primary device includes a primary display and the secondary device includes a secondary display. A confirmation is received at the primary device from the secondary device in response to the initiating. Based on receiving the confirmation, the wireless connection between the primary device and the secondary device is executed. The executing includes utilizing, by the primary device, the secondary display in place of the primary display.

10 Claims, 3 Drawing Sheets

(51) Int. Cl.
*G09G 5/12* (2006.01)
*G02B 27/01* (2006.01)
*G06F 1/16* (2006.01)
*H04W 8/00* (2009.01)
*H04W 84/18* (2009.01)

(52) U.S. Cl.
CPC ............ *G06F 1/163* (2013.01); *G06F 3/1423* (2013.01); *G06F 3/1446* (2013.01); *G09G 5/003* (2013.01); *G09G 5/006* (2013.01); *G09G 2354/00* (2013.01); *G09G 2356/00* (2013.01); *G09G 2370/042* (2013.01); *G09G 2370/16* (2013.01); *H04W 8/005* (2013.01); *H04W 84/18* (2013.01)

(58) Field of Classification Search
CPC ..... G06F 3/1454; H04W 84/18; H04W 8/005; G09G 5/12; G09G 5/003; G09G 5/006; G09G 2354/00; G09G 2356/00; G09G 2370/16; G09G 2370/042
See application file for complete search history.

(56) References Cited

U.S. PATENT DOCUMENTS

| | | | | |
|---|---|---|---|---|
| 6,297,802 B1* | 10/2001 | Fujioka | G06F 1/181 | 345/156 |
| 6,683,605 B1* | 1/2004 | Bi | H04L 29/12009 | 345/211 |
| 7,221,961 B1* | 5/2007 | Fukumoto | G06F 1/1616 | 455/41.2 |
| 8,254,992 B1* | 8/2012 | Ashenbrenner | G06F 1/1632 | 455/41.2 |
| 9,420,562 B1* | 8/2016 | Cai | H04W 64/003 | |
| 9,720,639 B1* | 8/2017 | Morgan | G06F 3/1454 | |
| 2009/0061895 A1* | 3/2009 | Vasa | H04W 4/02 | 455/456.2 |
| 2009/0267867 A1* | 10/2009 | Gonia | G06F 3/1454 | 345/1.1 |
| 2009/0270069 A1* | 10/2009 | Plymoth | H04L 12/14 | 455/407 |
| 2011/0109792 A1* | 5/2011 | Montag | H04L 65/602 | 348/390.1 |
| 2011/0320405 A1* | 12/2011 | Hsu | G06F 1/1632 | 707/634 |
| 2012/0020318 A1* | 1/2012 | Naoe | H04W 8/26 | 370/329 |
| 2012/0069131 A1* | 3/2012 | Abelow | G06Q 10/067 | 348/14.01 |
| 2012/0083208 A1* | 4/2012 | Giles | G06F 13/387 | 455/41.2 |
| 2012/0083209 A1* | 4/2012 | Giles | H04W 4/206 | 455/41.2 |
| 2012/0166851 A1* | 6/2012 | Davis | G06F 1/1616 | 713/324 |
| 2013/0050271 A1* | 2/2013 | Kim | G06F 3/147 | 345/667 |
| 2013/0109371 A1* | 5/2013 | Brogan | G06F 1/1626 | 455/420 |
| 2013/0162502 A1* | 6/2013 | Lee | G09G 5/003 | 345/1.2 |
| 2013/0201918 A1* | 8/2013 | Hirakawa | H04W 36/06 | 370/328 |
| 2013/0229944 A1* | 9/2013 | Montemurro | H04W 4/206 | 370/254 |
| 2013/0303289 A1* | 11/2013 | Zhang | A63F 13/12 | 463/42 |
| 2013/0328878 A1* | 12/2013 | Stahl | G06F 3/1431 | 345/428 |
| 2014/0022159 A1* | 1/2014 | Leigh | G06F 3/012 | 345/156 |
| 2014/0136352 A1* | 5/2014 | Ramakrishna | G06Q 20/10 | 705/21 |
| 2014/0185567 A1* | 7/2014 | Piipponen | H04W 4/008 | 370/329 |
| 2014/0197232 A1* | 7/2014 | Birkler | G06F 21/313 | 235/375 |
| 2015/0061969 A1* | 3/2015 | Chi | G06F 3/013 | 345/2.3 |
| 2015/0117414 A1* | 4/2015 | Tang | H04W 36/08 | 370/332 |
| 2015/0143217 A1* | 5/2015 | Rakshit | G06F 17/30884 | 715/208 |
| 2015/0156803 A1* | 6/2015 | Ballard | G02B 27/017 | 455/422.1 |
| 2015/0242065 A1* | 8/2015 | Ko | G09G 5/38 | 715/779 |
| 2015/0277559 A1* | 10/2015 | Vescovi | G06F 3/014 | 345/173 |
| 2015/0327240 A1* | 11/2015 | Yamada | H04W 72/02 | 455/426.1 |
| 2015/0334749 A1* | 11/2015 | Goto | H04W 8/005 | 370/254 |
| 2015/0379678 A1* | 12/2015 | Al-otoom | G06T 1/60 | 345/537 |
| 2016/0050714 A1* | 2/2016 | Bhide | H04W 76/06 | 455/414.1 |
| 2016/0149749 A1* | 5/2016 | Bunker | H04L 12/282 | 709/217 |
| 2016/0171417 A1* | 6/2016 | Sankaralingham | G06Q 10/06398 | 705/7.42 |
| 2016/0219033 A1* | 7/2016 | Hintermeister | H04L 63/083 | |
| 2016/0227596 A1* | 8/2016 | Otani | H04N 5/23206 | |
| 2016/0259609 A1* | 9/2016 | Tomita | G06F 3/14 | |
| 2016/0337821 A1* | 11/2016 | Kawakami | H04W 8/005 | |
| 2016/0345254 A1* | 11/2016 | Iwami | H04W 76/02 | |
| 2017/0006453 A1* | 1/2017 | Liu | H04W 8/005 | |
| 2017/0012821 A1* | 1/2017 | Sa | G06F 1/1632 | |
| 2017/0013654 A1* | 1/2017 | Itagaki | H04W 76/02 | |
| 2017/0078740 A1* | 3/2017 | Iwami | G06F 3/1454 | |
| 2017/0147273 A1* | 5/2017 | DeLuca | G06F 3/1423 | |

OTHER PUBLICATIONS

List of IBM Patents or Patent Applictions Treated as Related; (Appendix P), filed Jun. 9, 2016, 2 pages.

* cited by examiner

DISPLAY REDISTRIBUTION BETWEEN A PRIMARY DISPLAY AND A SECONDARY DISPLAY

DOMESTIC PRIORITY

This application is a continuation of U.S. patent application Ser. No. 14/972,206, filed Dec. 17, 2015, the content of which is incorporated by reference herein in its entirety.

BACKGROUND

The present invention relates generally to displaying information, and more specifically, to redistributing a display between a personal display and an external display.

SUMMARY

Embodiments include methods, systems, and computer program products for display redistribution between a personal display and an external display. A method includes initiating, by a primary device, a wireless connection between a primary device and a secondary device. The primary device includes a primary display and the secondary device includes a secondary display. A confirmation is received at the primary device from the secondary device in response to the initiating. Based on receiving the confirmation, the wireless connection between the primary device and the secondary device is executed. The executing includes utilizing, by the primary device, the secondary display in place of the primary display.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Embodiments of the present disclosure provide for a method, system, and computer program product for redistributing a display from a primary display to a secondary display. Embodiments can be used, for example, by an employee who uses a display located on a personal device, such as Google glasses, while moving between different business locations. Upon return to the office, the employee can utilize embodiments described herein to easily switch the display from the display located on the personal device to a display located on a desktop monitor. This redistribution can be performed in order to take advantage of a larger screen and/or a higher resolution provided by the desktop monitor. Redistributing the display to the desktop monitor (or to a projector) can also be performed in order to allow the employee to view the contents of the screen along with other employees.

Figure 1:
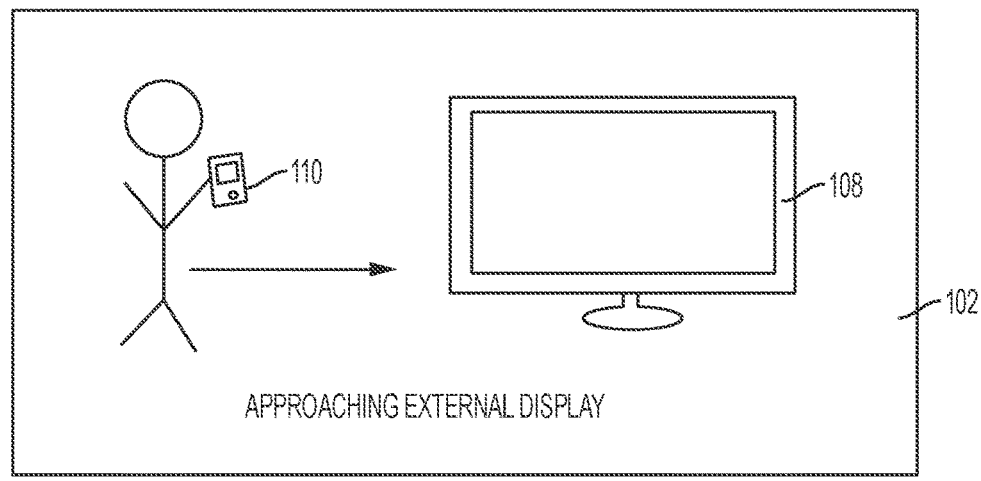
FIG. 1 depicts a schematic representation of redistributing a display from a primary display to a secondary display in accordance with an embodiment of this disclosure.
Figure 1:
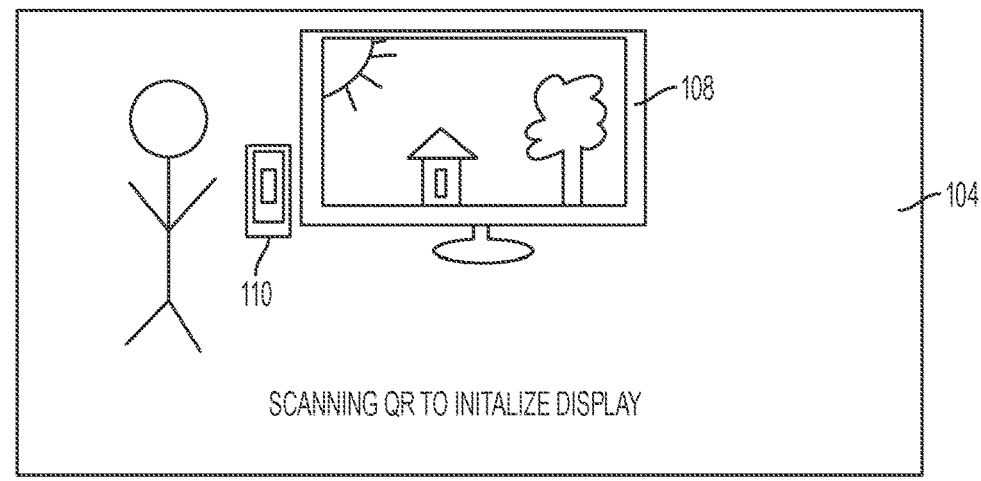
Figure 1:
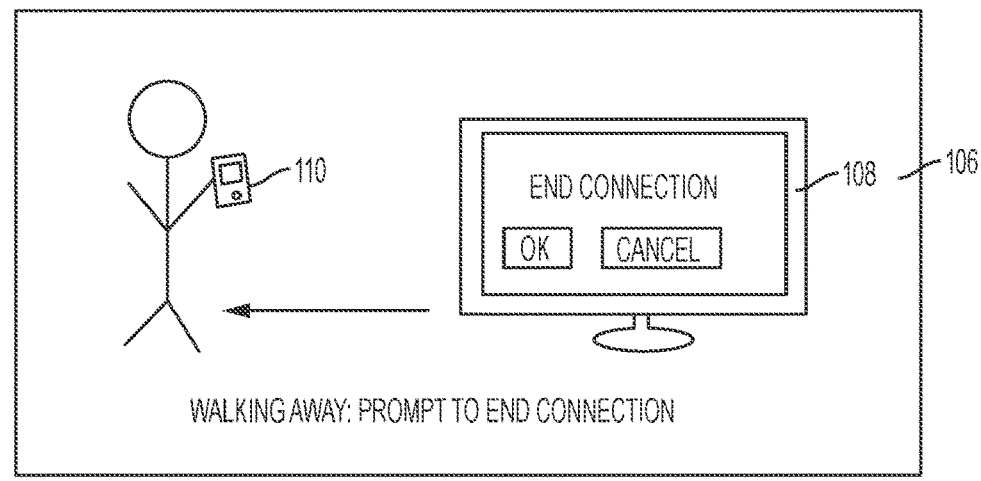

Turning now to FIG. 1, a schematic representation of redistributing a display from a primary display to a secondary display is generally shown in accordance with an embodiment. In the embodiment shown in FIG. 1, the primary display is located on a personal device 110 and the secondary display is located on an external device 108. Block 102 depicts a user with personal device 110 moving in to proximity of external device 108. As used herein, the term "personal device" refers to any portable or wearable device having a processor and a primary display such as, but not limited to: a heads up display (HUD), a watch, glasses (e.g., glasses worn in virtual reality environments), tablet, or a smartphone. Examples of wearable devices in the previous list include a HUD, a watch, and glasses. A personal device 110 can also include a combination of devices such as, but not limited to: a smart phone and a HUD; a watch and a tablet. As used herein, the term "external device" refers to any device capable of acting as a secondary display for the personal device such as, but not limited to: a computer monitor, a television, a projector, an audio system, an audio/video system, an organic light-emitting diode (OLED) display, and/or a liquid crystal display (LCD) device. An external device 108 can also include a combination of devices such as, but not limited to: an LCD and a processor; and a television and a set top box. In embodiments, the external device and the personal device communicate via a wireless network.

Referring back to FIG. 1, block 104 depicts the user scanning, by the personal device 110, a quick response (QR) code displayed on the display of the external device 108 to initialize the external display. Other manners of initializing the external display can also be used including, but not limited to: radio-frequency identification (RFID), Bluetooth, and/or eye-based gestures. As part of the initializing a communicative connection is established between the personal device 110 and the external device 108.

The output to a display is redistributed from the displaying on the personal device 110 to displaying on the external device 108. As described herein, a display can be redistributed from a primary display to a secondary display and, from a secondary display back to a primary display. The term redistributed here means to render the display contents on one device while ceasing the rendering on some other device. Said rendering can be local to a device when redistributed from a remote display to the physically coupled display or that rendering may be remote using remote direct memory access (RDMA) frame buffering, or achieved via various combined network display/input protocols including bidirectional feedback from external displays to the personal device. As used herein, the term "transferred" as used herein refers to the scenario by which the display contents are simultaneously redistributed from one display to another with the originating screen ceasing to display that content. The terms "copied" and "mirrored" as used herein indicate a means of redistribution wherein one or more displays presents the same content simultaneously.

Thus, when the display has been redistributed to the external display, the external display is treated as the sole display for the application executing on the personal device 110 (the personal display is disabled). The user can interact with the external display to perform any input functions (e.g., via touch screen commands, pointer device commands, keyboard, etc.) and to receive any outputs (text, graphics, audio, haptic, etc.) that are supported by the external display device.

Block 106 depicts that the connection between personal device 110 and the external display of the external device 108 ends when the user walks away from the external device 108. As part of terminating the connection, the display can be redistributed from the external display on the external device 108 back to the personal display on personal device 110. In an embodiment, terminating occurs due to a loss of signal strength from a wireless connection between the personal device 110 and the external device 108, or when a global positioning signal (GPS) derived from an operatively coupled GPS receiver on the personal device 110 is sent to the external device 108 to signal the termination of the remote display connection. Alternatively the personal device 110 may use an operatively coupled GPS or diminished signal from the external display 108 to halt the remote display sharing protocol that sends digital content to the external display 108, and in this mode of operation, external display 108 can be configured such that on loss of signal a screensaver or blanking procedure or other power savings scheme is triggered automatically. The means for displaying the signal remotely include RDMA framebuffers, remote desktop protocols like remote desktop protocol (RDP), virtual network computing (VNC) or other functional equivalents. Thus, the personal display is once again the sole display for the application executing on the personal device 102. The connection between the personal device 110 and the external display can also end in other manners such as, but not limited to the user instructing the primary device to stop broadcasting to the external display. In embodiments, when the connection ends the display is redistributed to the personal display on personal device 110.

Figure 2:
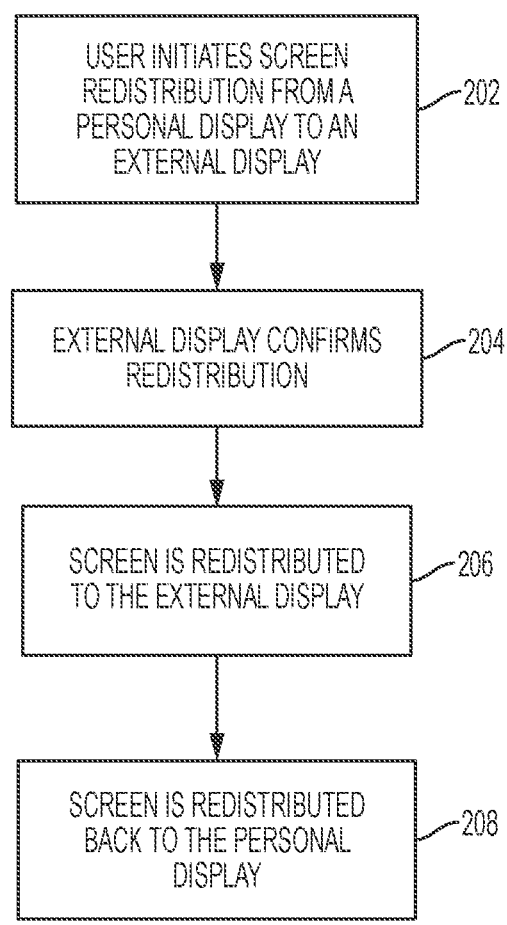
FIG. 2 depicts a flow diagram of a method of redistributing a display from a primary display to a secondary display in accordance with an embodiment of this disclosure.

Turning now to FIG. 2, a flow diagram of a method of redistributing a display from a primary display on a primary device to a secondary display on a secondary device is generally shown in accordance with an embodiment. At block 202, a user initiates the redistribution of screen output (e.g., display) from a display on a personal device to a secondary display (e.g., on an external device). In an embodiment, the personal device sends a request on a network (e.g. WiFi, Bluetooth, and/or RFID) for external devices that have displays that are available for redistribution. The user can then select one of the available external devices.

In embodiments, the external device communicates with the personal device via a well-known protocol, such as radio-frequency identification (RFID) or Bluetooth to advertise the service and to identify specifications of the external device. The external device can establish a communication connection with the personal device using, for example, multicast Domain Name System (mDNS). The communication can include transmitting a network port to connect to, as well as a remote screen display protocol(s) that is supported by the external display such as, but not limited to: virtual network computing (VNC), remote desktop protocol (RDP), and XQuartz (X11).

In an embodiment, the user of the personal device can respond to the external device over the established communication connection to initiate screen redistribution to the display on the external device. In other embodiments, the external device advertises the existence of the service and the user of the personal device responds to the advertising by requesting additional information about supported ports and/or protocols (e.g., by scanning a QR code). In embodiments, advertisement information from a plurality of external devices is presented to the user (e.g., in list form) and the user selects one of the external devices.

In embodiments where a QR code is used to initiate the screen redistribution, the display on the external device encodes the information (e.g., remote display capability, network port, and display protocol(s)) in the QR code or other graphic medium that is supported by the personal device. The personal device recognizes the QR code, translates the visual code into the network and protocol data necessary to communicate with the display on the external device, and then allows the display on the external device to be used as the display for the personal device (in place of the personal display on the personal device.) In embodiments, the QR code is recognized by the personal device only when the user is directly facing the display. In an embodiment, a user of the personal device sees the QR code, scans the QR code, and the personal device initiates the communication with the external device.

In embodiments, the personal device may require an additional confirmation before automatically transferring the display to a display on the external device. This additional confirmation can be an eye gesture or a tap on the frame (e.g., when the personal device is HUD that includes eyeglasses) or other physical iteration with a paired device such as ring or watch.

In embodiments, an eye-based gesture is utilized to initiate the screen redistribution. For example, the user can look at a monitor (e.g., an external display) for a set period and a webcam on the monitor can identify the gesture as wanting to use that monitor. Alternatively, or in addition, the gesture can be used to select an "okay" or "cancel" when automatically determining that the external display is capable of receiving a remote display connection from the personal device.

At block 204 of FIG. 2, the external device confirms that the user has requested that the display be redistributed from a display on the personal device to a display on the external device. In an embodiment, the external device notifies the user on the personal device and the user can reply to the external device through a vocal response by stating "yes" or "no." Other ways that the user can reply include, but are not limited to: facial or eye gestures such as "nodding" for yes or "shaking" for no and through input on the display on the private device. When the personal device is Google Glasses the user can enter input on the side of their personal device.

At block 206, the personal display is redistributed to the external display using near field wireless communication protocols such as, but not limited to wireless fidelity (WiFi), Bluetooth, and/or RFID. In embodiments, the redistribution uses a portion of the display on the external device and the display on the external device can be shared with other applications. In other embodiments, the redistribution uses the entire display on the external device and the display on the external device is not shared with other applications. In these embodiments, the information previously displayed on the external device can be overlaid with the screens from the personal device.

In an embodiment, the personal device stops using the external display at block 208 when the user of the personal device walks away or otherwise indicates that the primary device should stop broadcasting to the display on the external device. The personal device can go back to displaying output from the personal device on to the personal display thorough redistributing the display from the external device to a display on the personal device.

Figure 3:
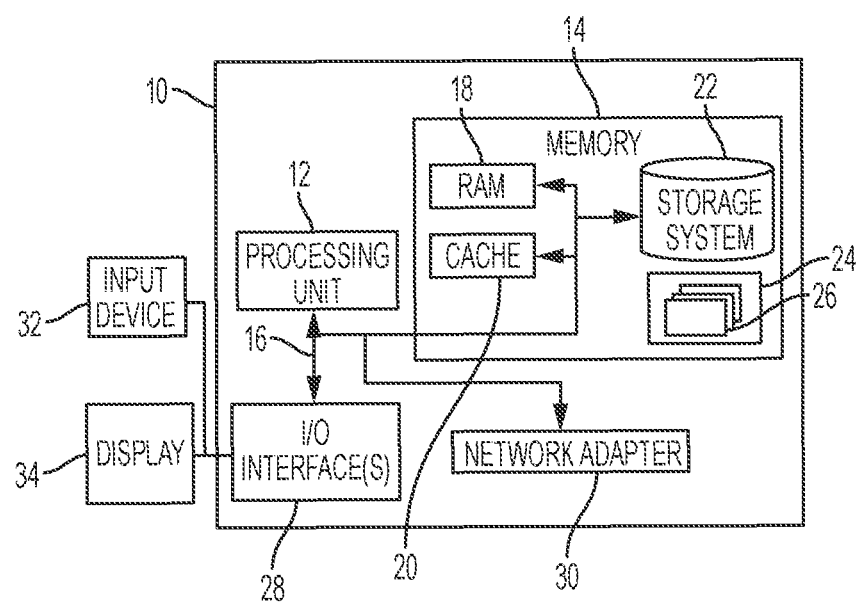
FIG. 3 depicts a processing device in accordance with an embodiment of this disclosure.

Turning now to FIG. 3, an example of a device 10 that can be used as a personal device or as an external device is generally shown in accordance with an embodiment. The device 10 is configured to store and process data, execute programs and display information to a user, such as textual, alphanumeric, symbolic and other visual information. In one embodiment, the device 10 is configured to receive or gather communications (e.g., text, spoken words, emails) from other locations, such as a network (e.g., Internet) and/or another processor (e.g., server, computer, mobile device). The device 10 may be any device capable of displaying text and other information to a user, such as a mobile device (e.g., a smartphone) a wearable device (e.g., a smart watch, a HUD), a tablet computer, a laptop computer, a desktop computer, a mainframe a server and others.

The device 10 includes various components and/or modules for performing various processing, sensing and display functions. The device 10 includes one or more processors or processing units 12, a memory 14, and a bus 16 that couples various components including the memory 14 to the processor 12.

The memory 14 includes computer readable media in the form of volatile memory, such as random access memory (RAM) 18 and/or cache memory 20. The device 10 may also include other removable/non-removable, volatile/non-volatile computer system storage media. For example, the memory 14 shown in FIG. 3 includes storage 22 including a non-removable, non-volatile magnetic media (e.g., a hard drive), and/or removable storage media such as a memory card or flash drive. The memory 14 may include at least one program product having a set (e.g., at least one) of program modules that are configured to carry out the functions of embodiments described herein. For example, the memory 14 stores a program or utility suite 24 including one or more program modules 26 to carry out the functions and/or methodologies of embodiments described herein.

The device 10 shown in FIG. 3 includes or is connected to various components, which may be incorporated in the device 10 or be external to the device 10. The device 10 includes various input/output (I/O) interfaces 28 for communication with components and may also include a network adapter 30 for communication with other devices or components over a suitable network or remote connection. The device 10 is connected to or includes at least one input device 32 such as a keyboard, mouse and/or touchscreen, and a display 34. The components shown in FIG. 1 and described herein are provided for illustrative purposes and are not intended to be limiting. In embodiments the device 10 includes a camera that can be used, for example to read a QR code. In embodiments, the device 10 includes a subset of the components shown in FIG. 1.

Technical effects and benefits include the ability to transition seamlessly between a primary and a secondary display.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for display redistribution, the method comprising:

initiating, directly by a primary device in proximity of a secondary device, a wireless connection between the primary device and the secondary device, the primary device including a primary display and the secondary device including a secondary display;

receiving, at the primary device, a confirmation from the secondary device in response to the initiating; and based on receiving the confirmation, executing the wireless connection between the primary device and the secondary device, the executing the wireless connection including utilizing the secondary display in place of the primary display to receive input commands and to display outputs, wherein the outputs are displayed on the secondary display and not on the primary display.

2. The method of claim 1, further comprising exiting the wireless connection, the exiting causing the primary display to be utilized by the primary device in place of the secondary display.

3. The method of claim 1, wherein the executing further comprises disabling the primary display.

4. The method of claim 1, wherein the secondary display is a liquid crystal display (LCD), an organic light-emitting diode (OLED) display, a haptic display, or a projector.

5. The method of claim 1, wherein the initiating includes determining a network port and a remote screen display protocol for the wireless connection.

6. The method of claim 1, wherein only a portion of the secondary display is utilized by the executing.

7. The method of claim 1, further comprising exiting the wireless connection, wherein the exiting causes a power savings scheme to be triggered on the secondary display.

8. The method of claim 1, further comprising receiving an additional confirmation from a user of the primary device that the secondary display should be used in place of the primary display, wherein the executing the wireless connection is further based on the additional confirmation.

9. The method of claim 1, wherein the primary device is a personal device.

10. The method of claim 9, wherein the personal device is a wearable device.

* * * * *